C. L. ST. CLAIR.
MACHINE FOR THRESHING OR SHELLING GRAIN.
APPLICATION FILED JULY 24, 1918.
1,307,322.
Patented June 17, 1919.
3 SHEETS—SHEET 3.
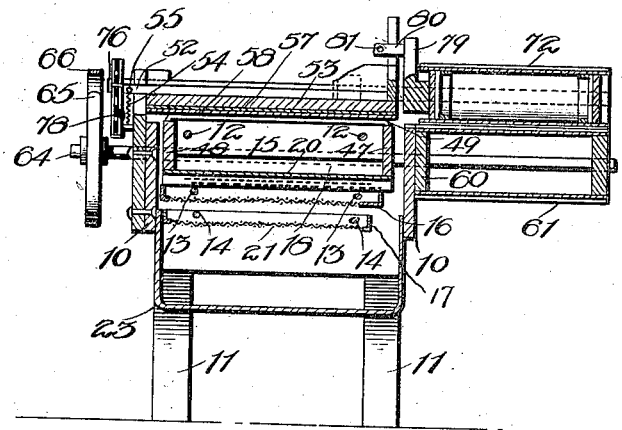
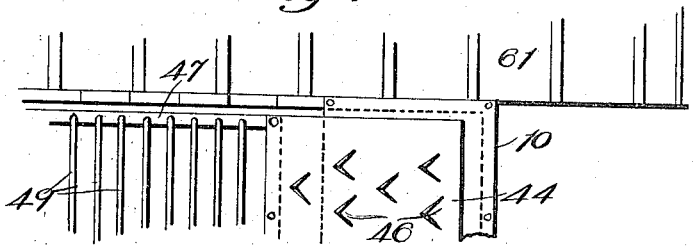
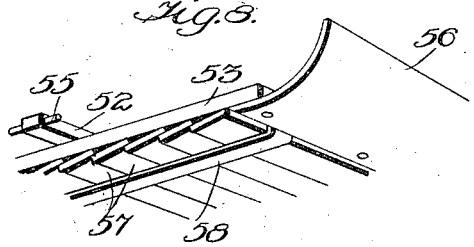
WITNESSES
INVENTOR
C. L. St. Clair,
BY
ATTORNEYS

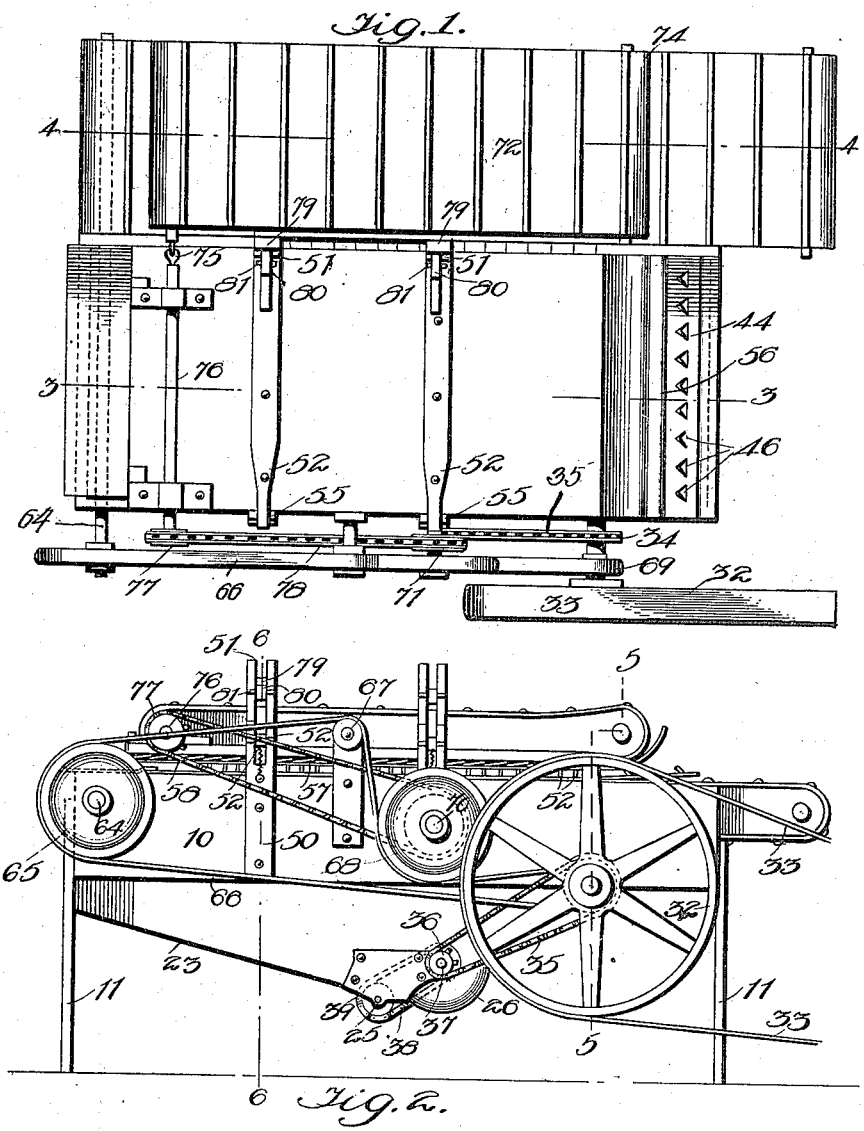

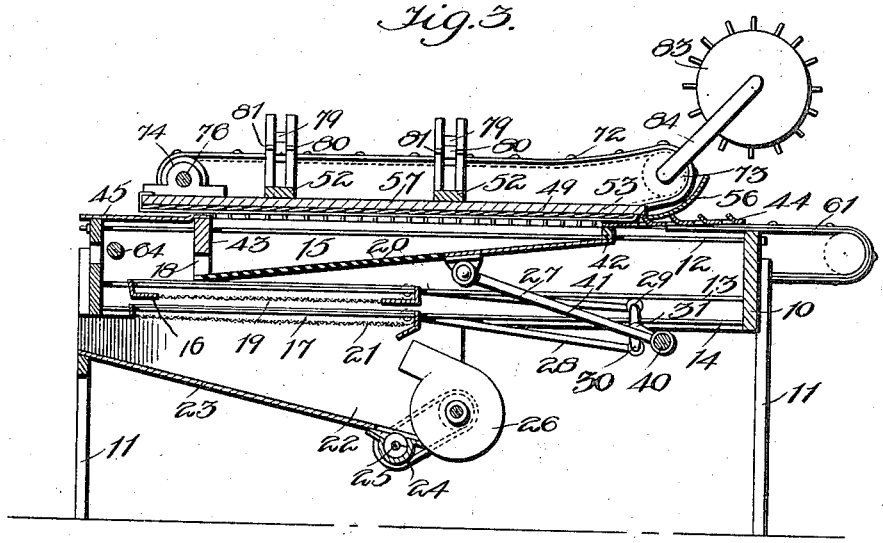
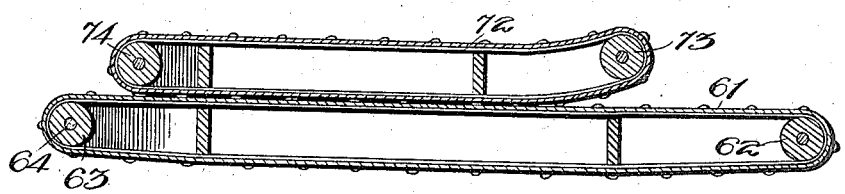
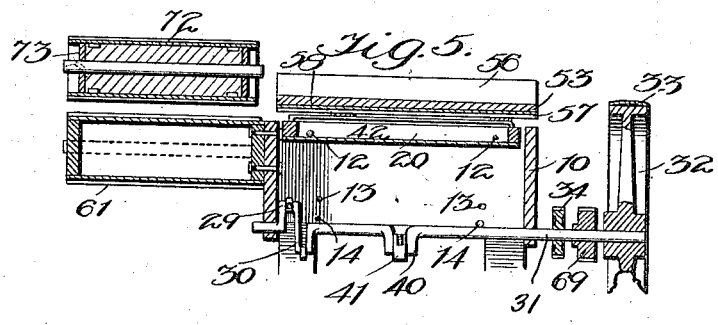

UNITED STATES PATENT OFFICE.

CHARLES LEONARD ST. CLAIR, OF CONCORDIA, KANSAS.

MACHINE FOR THRESHING OR SHELLING GRAIN.

1,307,322.  Specification of Letters Patent.  Patented June 17, 1919.

Application filed July 24, 1918. Serial No. 246,554.

*To all whom it may concern:*

Be it known that I, CHARLES LEONARD ST. CLAIR, a citizen of the United States, and a resident of Concordia, in the county of Cloud and State of Kansas, have invented a new and useful Improvement in Machines for Threshing or Shelling Grain, of which the following is a specification.

My present invention relates generally to threshing apparatus, and more particularly to a machine for threshing or shelling grain, my primary object being the provision of means by which hemp, Kafir corn, fedderita and other similar grains may be shelled or threshed without injuring the hemp stalk or fiber, or in a case of other grains, without heading, opening bundles or injuring the fodder.

The apparatus for carrying out these objects may be readily understood from the accompanying drawings, forming a part of this specification and to which the description refers by numbers.

In these drawings:—

Figure 1 is a top plan view of my improved apparatus,

Fig. 2 is a side elevation thereof,

Figs. 3 and 4 are vertical longitudinal sections taken respectively on lines 3—3 and 4—4 of Fig. 1, Figs. 5 and 6 are vertical transverse sections taken respectively on lines 5—5 and 6—6 of Fig. 2, Fig. 7 is a detail plan view of a portion of the threshing frame, Fig. 8 is a detail perspective view of a portion of the bearing plate.

Referring now to these figures my invention comprises a rectangular stationary open frame 10, supported in elevated position upon legs or other supports 11, and having upper, intermediate and lower horizontal longitudinally extending guide rods 12, 13 and 14 respectively on which are disposed the threshing frame 15 and screen frames 16 and 17.

The rods 12, 13 and 14 pass through the forward and rear cross bars of the respective frames 15, 16 and 17, the rear cross bar of the threshing frame 15 having a lower opening 18 through which the threshed grain and the like passes downwardly onto the upper screen 19 of the frame 16, from the downwardly and rearwardly sloping base 20 of the threshing frame, as most plainly seen in Fig. 3, the grain dropping in turn through the screen 19 and the screen 21 of the lower frame 17, and into a hopper 22 having a forwardly and downwardly sloping base 23 at the lower portion of which is a trough 24 provided with a laterally disposed grain discharging auger 25. Adjacent the lower end of the hopper 23 is also disposed a fan 26 which directs a current of air upwardly through the hopper so as to force chaff or other lighter material outwardly from the upper end thereof.

The screen frames 16 and 17 which extend for the major portion of the width of the main frame 10 and which are thus slidable rectilinearly upon the guide rods 13 and 14, are in superposed relation and are connected by pitmen 27 and 28 with the cranks 29 and 30 of a forward shaft 31 extending transversely beneath the main frame 10 as best seen in Fig. 5 and projecting laterally beyond one side of said main frame and there provided with an enlarged pulley 32 which receives a belt or other power connection 33 from a suitable source of power for driving the several movable parts of the apparatus. Shaft 31 also has a sprocket wheel 34 secured thereon connected by a sprocket chain 35 with a sprocket wheel 36 upon the shaft 37 of the fan 26 before referred to, which shaft 37 is in turn connected by sprockets and a chain 38 with the shaft 39 of the grain auger 25.

Centrally between the sides of the main frame 10 shaft 31 is furthermore provided with a crank 40 connected by a pitman 41 with the threshing frame 15, the latter of which has its forward and rear cross bars 42 and 43 respectively provided with forwardly and rearwardly projecting aprons 44 and 45 disposed slidably upon the upper forward and rear portions of the main frame 10, the forward apron 44 having a plurality of integral upset spurs or projections 46 inclined upwardly and rearwardly for a purpose which will be presently described.

Between the forward and rear aprons 44 and 45 the threshing frame, which is movable horizontally in a rectilinear line above the screens 19 and 21, has its side bars 47 and 48 forming anchors for the downwardly bent angular ends of a series of transversely extending spaced parallel threshing bars 49, the surfaces of which are rounded and smooth, and which project in the same horizontal plane slightly above the plane of the upper edges of the threshing frame side bars 47 and 48 as will be clearly seen by reference to Figs. 5 and 6.

At one side of the main frame 10 are a pair of upstanding rigid guide arms 50, each having its portion above the upper edge of the main frame provided with a vertical slot 51 to receive the adjacent ends of the laterally extending cross bars 52 of a presser frame 53, which is generally rectangular and disposed upon the threshing frame in such manner that it may yield vertically with respect thereto, this presser frame being, however, immovable in a longitudinal direction so that the threshing frame in its movement upon the guide rods 12 shifts with respect to the presser frame. The loose engagement of the cross bars 52 within the slotted uprights 50 provides for the vertical wielding movement of the presser frame 53 which is resisted both by the weight of this frame and by springs 54, one of which is seen in Fig. 6, connecting the extremities of the cross bars 52 with stationary portions of the main frame 10, the said extremities of cross bars 52 having cross pins 55 to prevent lateral shifting of the presser frame in one direction.

At its forward end the presser frame 53 is provided with a forwardly extending and upwardly curved apron 56, this being the receiving end for the grain, which is thus guided beneath the curved apron 56 and which is fed rearwardly into the space between the threshing frame and the presser frame by virtue of the upwardly and rearwardly inclined feed spurs or projections 56 of the forward apron 44 of the threshing frame.

The lower surface of the presser frame 53 is furthermore roughened to promote feed of the material being threshed throughout the length of the threshing frame and to this end is provided with lap boards 57 as most plainly seen in Fig. 8, the lapped portions of which form rearwardly presented shoulders, so as to obviate forward movement of the grain being threshed with the forward movement of the threshing frame. It will be noted from Figs. 6 and 8 furthermore that the lower surface of the presser frame 53 has longitudinal strips 58 which project below the plane of the lap boards 57 so as to rest upon the series of threshing bars 49 when the machine is running empty in order to obviate catching of the lap boards into these threshing bars and possible displacement or breakage of the latter.

At the relatively opposite side of the main frame 10 as compared to the upright 50, is secured one side wall 60 of a conveyer frame around which an endless feed conveyer 61 operates, this conveyer having its upper run movable in a horizontal plane, but slightly above the horizontal plane of the upper edge of the main frame 10 and extending forwardly slightly beyond the forward end of said frame to receive the hemp, grain or other material thereon. The frame of this conveyer is rigid with the main frame 10 and the conveyer 61 operates about forward and rear rollers 62 and 63, the shaft 64 of the latter of which is extended through the rear portion of the main frame 10 and provided beyond the relatively opposite side of the latter with a pulley 65 around which one end of a belt 66 travels, the said belt extending around an intermediate idler 67 and a pulley 68 and connecting with a pulley 69 on the crank shaft 31, pulleys 68 being upon a shaft 70 provided with a sprocket wheel 71 for a purpose which will be presently described. A second endless feed conveyer 72 operates above the conveyer 61 and in conjunction with the latter serves to feed the stalks or bundles rearwardly as the grain heads pass rearwardly between the threshing frame 15 and the presser frame 53, conveyer 72 extending around forward and rear pulleys 73 and 74, the shaft of the latter of which is connected by a universal joint 75 seen in Fig. 1 with one end of a shaft 76 mounted in bearings upon the rear portion of the presser frame 53 and provided at one end beyond one side of the main frame 10 with a sprocket wheel 77 connected by a sprocket chain 78 with the sprocket wheel 71 located as just above described. The frame of the conveyer 72 is flexibly attached to one side of the presser frame 53 and is provided with upstanding side members 79 having angular pieces 80 which for the purpose just mentioned are disposed loosely within slotted uprights 81 projecting upwardly from the adjacent side of the presser frame 53, angular pieces 80 having cross pins 81 which prevent lateral displacement of the upper conveyer 72.

In operation the hemp, grain or other material to be threshed is disposed upon the forward portion of the conveyer 61 with its grain heads upon the forward apron 44 of the threshing frame and that the hemp or grain so disposed will be fed rearwardly, either when loose or in bundles, with the stalk or fodder between the feed conveyers 72 and 61, the former of which is yieldable vertically with respect to the latter either with the presser frame 53, or independent thereof, while greater yielding movement is required between the conveyers as compared to that required between the threshing frame and the presser frame 53.

It is obvious furthermore that during this operation the longitudinal rectilinear movement of the threshing frame 15 will serve to cause the threshing bars 49 thereof to rub the grain heads thoroughly from the stalks or fodder and in this way shell or thresh the grain which will drop between the said threshing bars and into the base 20 of the threshing frame, the inclination of which causes the grain to pass downwardly to its rear end and outwardly through the opening 18 of its rear cross bar onto the upper screen 19. These screens 19 and 21 similarly moving as compared to the movement of the threshing frame will sift the grain therethrough into the hopper 23, from which the grain is discharged as before described by the action of the screw or auger 25.

It will also be noted that the apparatus as a whole may be readily built either portable or stationary in its nature and provided with any suitable adjustments such as for instance now used for stacking up the hemp or grain at the forward end and dropping it back upon the ground at the rear end, and that if so desired a binding attachment may be utilized at the rear by which to bind the stalks, straw or fodder, and drop the same in bound form at the rear after threshing.

The pressure of the frame 53 downwardly against the grain to hold the same against the upper grated surface of the threshing frame may be adjusted or released by adjusting the springs 54 connecting the frame 53 with the main frame 10 and it is, of course, to be understood that the spaces of the threshing grain, that is, the spaces between the threshing bars 49, may be greater or smaller as desired, dependent upon the size and capacity of the machine.

As to the feeding conveyers which coöperate to feed the grain rearwardly and which are driven at uniform speeds, it is to be noted that the conveyer aprons are extended laterally beyond the ends of their rollers and that the parts are otherwise fashioned in such manner as to obviate danger of the grain wrapping around shafting or upon the rollers of the conveyers or the gudgeons of these rollers.

Fig. 3 shows a slight modification to the extent of mounting a toothed pressure wheel 83 at the front, which, in addition to its rotation upon journals in side bars 84, may move up and down by virtue of the fact that said side bars are pivoted on the ends of the shaft of the forward belt roller 73. Thus the pressure wheel may rest upon, and assist in the feeding movement of, the grain.

I claim:—

1. A threshing apparatus of the character described comprising a main horizontal frame, a horizontal rectilinearly movable threshing frame within the main frame and having a grated upper surface, a presser frame above the main and threshing frames having a movable connection with the main frame to permit the same to yield vertically with respect to the threshing frame, and upper and lower conveyers at one side of the main frame and coöperating with one another, the lower conveyer being mounted upon the main frame and the upper conveyer having a movable connection with the said presser frame.

2. In a threshing apparatus of the character described, a horizontally disposed rectangular main frame, having longitudinally extending guide rods, a threshing frame having a sloping base and forward and rear cross bars through which the guide rods extend, means for imparting movement to the threshing frame to reciprocate the same upon the said guide rods, said threshing frame having a grated upper surface, and a presser frame above the threshing frame having a movable connection with the main frame to permit the same to yield vertically with respect to the threshing frame.

3. In a threshing apparatus, a main frame, a horizontally shiftable threshing frame having forward and rear aprons disposed upon the forward and rear portions of the main frame and provided with a grated rubbing surface between the said aprons through which the threshed grain may fall, and a presser frame disposed upon the said threshing frame and yieldable vertically with respect thereto, said forward apron of the threshing frame having upstanding feed spurs for the purpose described.

4. In a threshing apparatus, a main frame, a horizontally shiftable frame having forward and rear aprons disposed upon the forward and rear portions of the main frame and provided with a grated rubbing surface between the said aprons through which the threshed grain may fall, and a presser frame disposed upon the said threshing frame and yieldable vertically with respect thereto, said threshing frame having forward and rear cross bars and an inclined base receiving the grain dropping through its grated surface.

5. In a threshing apparatus of the character described, a main frame, a rectilinearly movable threshing frame shiftable horizontally in the main frame and having an upper rubbing surface, and a presser frame having movable connection with the main frame and disposed above and yieldable vertically with respect to the said threshing frame, said frame having lapped boards along its lower face forming transversely extending and rearwardly presented shoulders for the purpose described.

6. In a threshing apparatus, a main frame, a reciprocating threshing frame mounted in the main frame and movable rectilinearly in a horizontal direction, said threshing frame being provided with a series of upper transversely extending parallel threshing bars forming a grated surface and a presser frame disposed upon the threshing frame and having a movable connection with the main frame to permit the same to yield vertically with respect to the threshing frame, said presser frame having its lower surface provided with lapped boards forming transversely extending and rearwardly presented shoulders to assist in the feeding of the grain and said presser frame having longitudinally extending bearing strips depending below the lap boards to prevent engagement of the latter with the threshing bars of the said threshing frame.

7. A threshing apparatus including a main horizontal frame, a threshing frame movable horizontally therein, a presser frame disposed upon the threshing frame and having a movable connection with the main frame to permit the same to yield vertically with respect to the threshing frame and upper and lower coöperating feed aprons at one side of the main frame, the upper apron of which is movably connected at one side to the adjacent side of the presser frame.

8. A threshing apparatus including a main frame, a horizontally movable threshing frame within the main frame, slotted uprights secured to one side of the main frame and projecting above the threshing frame, a presser frame disposed upon the threshing frame and having cross bars projecting at one end through the slots of the said main frame, uprights to movably connect the presser frame and permit the latter to move vertically with respect to the threshing frame, springs connecting the presser frame with the main frame, slotted uprights carried by the opposite side of the presser frame, and upper and lower coöperating feed aprons at the opposite side of the main frame, the lower of which aprons is carried by the main frame and the upper of which aprons has side extensions movably engaging the slotted uprights of the presser frame for the purpose described.

CHARLES LEONARD ST. CLAIR.

Copies of this patent may be obtained for five cents each, by addressing the "Commissioner of Patents, Washington, D. C."